3,060,201
4-HYDROXY-17α-METHYL-3-KETO - Δ⁴ - STEROIDS OF ANDROSTANE AND 19-NOR-ANDROSTANE SERIES AND ESTERS THEREOF
Bruno Camerino, Milan, Bianca Patelli, Stradella, and Giovanni Sala, Milan, Italy, assignors to Società Farmaceutici Italia, Milan, Italy, a corporation of Italy
No Drawing. Filed June 3, 1959, Ser. No. 817,744
Claims priority, application Great Britain June 6, 1958
18 Claims. (Cl. 260—397.4)

This invention relates to new steroid compounds, and their process of preparation.

This application is a continuation-in-part of our co-pending or co-filed application Serial No. 817,743, filed June 3, 1959, subsequently abandoned.

The new steroids are of the following general types:

Compounds A of the general formula:

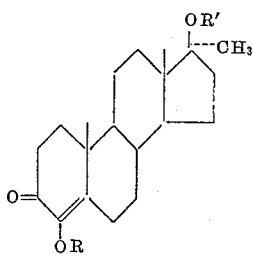

in which R and R' are hydrogen atoms or acyl groups each containing not more than 9 carbon atoms, R and R' being the same or different.

Compounds B, namely 4,11-beta-dihydroxy-17-alpha-methyl-testosterone and esters thereof, of the general formula:

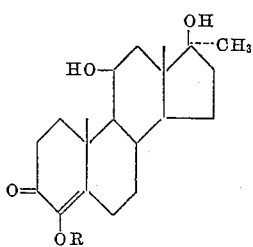

wherein R is hydrogen or an acyl group derived from an aliphatic, cyclic or partly cyclic carboxylic acid containing not more than 9 carbon atoms, for example from cyclopentane-propionic acid or benzoic acid.

Compounds C, namely 4-hydroxy-17-alpha-methyl-19-nortestosterone and esters thereof of the general formula:

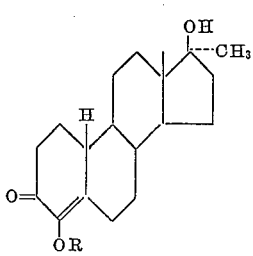

wherein R is hydrogen or an acyl group derived from an aliphatic, cyclic or partly cyclic carboxylic acid containing not more than 9 carbon atoms, for example from cyclopentane-propionic acid or benzoic acid.

The preparation of the compounds of the types A, B, and C will be described in that order.

Preferred compounds of type A provided by the invention are 4-hydroxy - 17 - alpha-methyltestosterone, 4-hydroxy-17-alpha-methyltestosterone - 4 - acetate and 4-hydroxy-17-alpha-methyltestosterone - 4 - cyclopentylpropionate, 4-hydroxy-17-alpha - methyltestosterone-4-succinate, 4-hydroxy-17-alpha-methyltestosterone-4,17-diacetate, 4-hydroxy-17-alpha-methyltestosterone-17-acetate and 4-hydroxy-17-alpha-methyltestosterone-17-propionate.

The steroids of the present invention may be prepared according to the following reaction scheme:

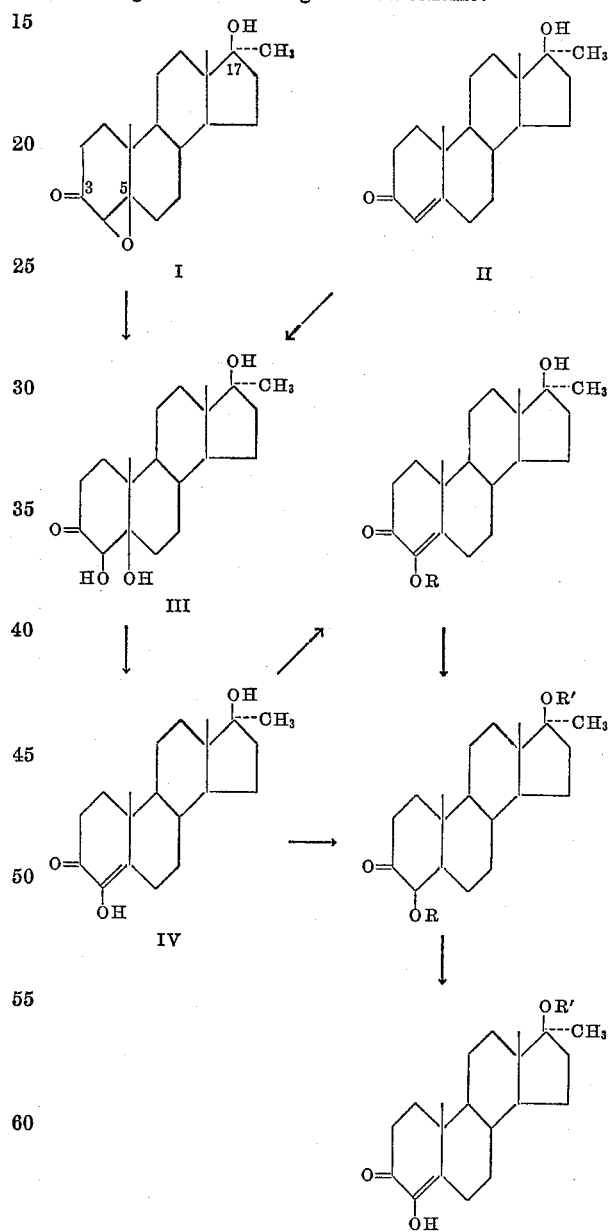

wherein R and R' are as defined above.

Thus the invention further provides a method of preparing 4-hydroxy-17-alpha-methyltestosterone which comprises selectively dehydrating 4,5-dihydroxy-17-alpha-methyltestosterone (III) in position 5 in alkaline solution. It is noted that said compound III is also, and perhaps preferably, named 17-alpha-methyl-androstane-4-beta,5-alpha,17-beta-triol-3-one.

In practising the process of the present invention, the said compound (III) may be obtained either from the corresponding 4,5-epoxide by reaction with dilute sulfuric acid in methanol solution at room temperature, or from 17-alpha-methyltestosterone. Preferably it is dehydrated with potassium hydroxide in water and methanol.

The dehydration, in which only the hydroxy group in position 5, and not the hydroxy group in position 17, is eliminated, is the most surprising part of the process of this invention.

It is known that the hydroxy group in position 17 of 17-alpha-methyltestosterone is eliminated very easily. Thus, by reacting the 4,5-diol with sulfuric and acetic acid mixture, sulfuric acid in benzene, formic acid or boron trifluoride in ether, compounds are obtained lacking the hydroxy group in position 17.

Only dehydration in alkaline solution causes selective elimination of the hydroxy group in position 5, the hydroxy group in position 17 remaining unaffected.

The hydroxy group in position 4 of 4-hydroxy-17-alpha-methyltestosterone (IV) may then be esterified by reaction with the chloride or anhydride of a carboxylic acid containing up to and including nine carbon atoms. The esterification of 4-hydroxy-17-alpha-methyltestosterone with the chloride or anhydride of a carboxylic acid in the presence of pyridinium chloride, provides the 4,17-diesters. The 17-monoesters of 4-hydroxy-17-alpha-methyltestosterone may be obtained by selective alkaline hydrolysis in 4-position of the 4,17-diesters.

The compounds of the invention provide highly active pharmacological agents. For example 4-hydroxy-17-alpha-methyltestosterone is a strong protein anabolic steroid, having a high myotrophic and low androgenic effect.

Its myotrophic activity is about three times higher than that of 17-alpha-methyltestosterone and at least 5 times higher than that of 17-alpha-ethyl-19-nortestosterone. Its androgenic activity is lower than that of 17-alpha-methyltestosterone.

It is also notable that while 4-hydroxy-testosterone acetate is devoid of oral activity, 4-hydroxy-17-alpha-methyltestosterone, one of the compounds provided by the present invention, is highly effective orally. Therefore, 4-hydroxy-17-alpha-methyltestosterone is useful for treatment of protein depletion, preparation for surgery, recovery from surgery, recovery from severe illness, nutritional care of carcinomatosis and chronic diseases, premature infants, wound healing, bone fracture and osteoporosis.

The following examples illustrate preferred embodiments of the invention.

EXAMPLE 1

*4-Hydroxy-17-Alpha-Methyltestosterone (IV)*

A solution of 1 g. of crude 4,5-oxido-17-alpha-methyltestosterone (I) in 50 ml. of methanol is allowed to stand at room temperature overnight with 10 ml. of water and 1 ml. of concentrated sulfuric acid. It is then poured into water containing sodium chloride and extracted three times with ethyl acetate. The solvent is washed with water, then with 10% sodium bicarbonate solution and again with water to neutrality. The residue remaining after evaporation of the solvent is crystallized from methanol, giving 17-alpha-methyl-androstane-4-beta,5-alpha,17-beta-triol-3-one with a melting point of 203–205° C.

A solution of 0.220 g. of 17-alpha-methyl-androstane-4-beta,5-alpha,17-beta-triol-3-one in 100 ml. of methanol is allowed to stand at room temperature for 22 hours, under nitrogen, with 0.300 g. of potassium hydroxide in 4 ml. of water and 20 ml. of methanol. The solution is then neutralized with acetic acid, concentrated in vacuo, diluted with water and extracted three times with ethyl acetate. The extract is washed with water and the solvent removed by distillation. The remaining residue is chromatographed over Florisil 30–60 mesh. The fractions eluted with benzene and benzene-ether (10:1) are combined and by crystallization from ether-petroleum ether give 4-hydroxy-17-alpha-methyltestosterone (IV) (0.120 g.) melting at 168–170° C. and having an ultraviolet absorption maximum at 277 m$\mu$, with a molecular extinction coefficient of 12,920.

EXAMPLE 2

*4-Hydroxy-17-Alpha-Methyltestosterone (IV)*

A solution of 20 g. of 17-alpha-methyltestosterone (II) in 500 ml. of trimethylcarbinol is treated by addition of 56 ml. of 30% hydrogen peroxide and 1 g. of osmium tetroxide in 80 ml. of trimethylcarbinol.

After the mixture has stood at room temperature for 22 hours, 12 ml. of hydrogen peroxide are added. The reaction mixture is allowed to stand at room temperature for an additional 20 hours, then concentrated in vacuo to one-third of its original volume, diluted with water, and the reaction product extracted with ethyl acetate. The extract is washed with water, several times with 10% sodium bisulphite solution, then with 4% sodium bicarbonate solution and finally with water to neutrality. The residue remaining after evaporation of the solvent does not show ultraviolet absorption. 1 g. of this crude substance, by crystallization from methanol, gives 17-alpha-methyl-androstane-4,5,17-beta-triol-3-one (0.400 g.) melting at 192–194° C.

A solution of 20 g. of crude 17-alpha-methyl-androstane-4,5,17-beta-triol-3-one in 1 liter of methanol is heated under reflux in a stream of nitrogen for 20 minutes; then 20 g. of potassium hydroxide in 40 ml. of water and 200 ml. of methanol are added. 5 minutes after the addition, the solution is treated by addition of 20 ml. of acetic acid and concentrated in vacuo. The residue is diluted with water containing sodium chloride and extracted three times with ethyl acetate. The extract is washed with 10% sodium bicarbonate solution and then with water to neutrality. The residue remaining after evaporation of the solvent is dissolved in acetone; addition of petroleum ether gives 4-hydroxy-17-alpha-methyltestosterone (8 g.) (IV) melting at 168–170° C. The mother liquors chromatographed over Florisil 30–60 mesh yield an additional 5 g. of the same substance melting at 168–170° C.

EXAMPLE 3

*The 4-Acetate of 4-Hydroxy-17-Alpha-Methyltestosterone*

A solution of 0.5 g. of 4-hydroxy-17-alpha-methyltestosterone in 3 ml. of pyridine is treated by addition of 0.5 ml. of acetic anhydride and allowed to stand at room temperature overnight; then ice is added, and after standing in an ice-bath for one hour, the mixture is extracted three times with ethyl acetate; the extract is washed with a 2-N hydrochloric acid solution, then with water, 10% sodium bicarbonate solution and again with water to neutrality. The residue (0.560) remaining after evaporation of the solvent is dissolved in ether, yielding, by addition of petroleum ether, 4-hydroxy-17-alpha-methyltestosterone-4-acetate (0.350 g.) melting at 138–140° C. and having an ultraviolet absorption maximum at 246 m$\mu$, with a molecular extinction coefficient of 13,740.

EXAMPLE 4

*The 4-Cyclopentylpropionate of 4-Hydroxy-17-Alpha-Methyltestosterone*

In the same manner as Example 3, 4-hydroxy-17-alpha-methyltestosterone-4-cyclopentylpropionate is prepared by reacting 4-hydroxy-17-alpha-methyltestosterone with more than one equivalent of cyclopentylpropionyl chloride in pyridine.

EXAMPLE 5

*4-Hydroxy-17-Alpha-Methyltestosterone-4-Succinate*

A mixture of 2 g. of 4-hydroxy-17-alpha-methyltestosterone, dissolved in 10 ml. of pyridine, and 2 g. of succinic anhydride is heated on a water bath for 1 hour and then allowed to stand at room temperature for two days.

After adding water and 2 N HCl, the solution is extracted with ethyl acetate. The extract is washed with water and 2 N NaOH. The alkaline solution is acidified with 2 N HCl and extracted again with ethyl acetate.

The extract which has been washed to neutrality is evaporated and the residue is crystallized from acetone/petroleum ether.

The product, melting at 161–163° C., has an ultraviolet absorption maximum at 247 m$\mu$, with a molecular extinction coefficient of 14,650.

EXAMPLE 6

*4-Hydroxy-17-Alpha-Methyltestosterone-4,17-Diacetate*

A mixture of 5 g. of 4-hydroxy-17-alpha-methyltestosterone, 10 ml. acetic anhydride, 2.5 ml. pyridine and 1 g. pyridinium chloride, dissolved in 10 ml. of chloroform is heated to boiling for three hours.

The solvent is removed and the residue is treated with ice. The product is extracted with ethyl acetate, the extract is washed with 2 N HCl, water, 10% aqueous solution of NaHCO$_3$ and finally with water. After removing the solvent, ether is added. 3.5 g. of product, melting at 152–156° C., are obtained having an ultraviolet absorption maximum at 246 m$\mu$, and a molecular extinction coefficient of 15,470.

EXAMPLE 7

*4-Hydroxy-17-Alpha-Methyltestosterone-17-Acetate*

500 mg. of 4-hydroxy-17-alpha-methyltestosterone-4,17-diacetate dissolved in 20 ml. of methanol, are treated with 500 mg. of KHCO$_3$ dissolved in 5 ml. of water, at 40° C. for 1 hour. The solution is cooled, neutralized with acetic acid, concentrated to a small volume and extracted with ethyl acetate. The neutral extract is evaporated and the residue crystallized from methanol.

The product (200 mg.) melts at 178–180° C., and has an ultraviolet absorption maximum at 277 m$\mu$, with a molecular extinction coefficient of 12,450.

EXAMPLE 8

*4-Hydroxy-17-Alpha-Methyltestosterone-17-Propionate*

A mixture of 2 g. of 4-hydroxy-17-alpha-methyltestosterone-4-acetate, 10 ml. of pyridine, 4 ml. propionic anhydride, 400 mg. of pyridinium chloride in 2 ml. of chloroform, is heated to boiling for three hours and then allowed to stand at room temperature for a night. Ice is added to the solution with stirring. After stirring for 1 hour the product is extracted with ethyl acetate and the extract is washed with 2 N HCl, water, an aqueous 10% solution of NaHCO$_3$ and finally with water.

The solvent is evaporated and the residue (2.4 g.) dissolved in 80 ml. of methanol, is treated with 2.4 g. of KHCO$_3$ in 20 ml. of water, at 40° C. for 1 hour. The cooled solution is neutralized with acetic acid, concentrated to a small volume and extracted with ethyl acetate. The extract is evaporated to dryness.

The residue is crystallized from methanol.

The product (500 mg.) melts at 172–174° C. and has an ultraviolet absorption maximum at 277 m$\mu$, with a molecular extinction coefficient of 11,860.

Pharmacological Activities—Anabolic Activity

Myotrophic and androgenic activity of 4-hydroxy-17-alpha-methyltestosterone per os were determined according to the method of Herschberger, Shipley and Meyer (Proc. Soc. Exp. Biol. and Med. 83, 175 (1953)). The results are shown in Table I.

TABLE I.—MYOTROPHIC AND ANDROGENIC ACTIVITY OF 4-HYDROXY-17-ALPHA-METHYLTESTOSTERONE AND OTHER STEROIDS. ALL THE STEROIDS ARE APPLIED "PER OS"

| Steroid | Animals No. | Dose, mg./die/7 days | Levator ani, mg. | Ventral prostate, mg. | Therapeutic index |
|---|---|---|---|---|---|
| Controls | 174 | | 8.6−0.33 | 9.3±0.41 | |
| 17-alpha-methyltestosterone | 41 | 1 | 13.4 | 36.3 | 0.18 |
| | 77 | 2 | 17.7 | 43.9 | 0.26 |
| | 6 | 4 | 25.5 | 73.7 | 0.26 |
| 17-alpha-ethyl-19-nortestosterone | 10 | 1 | 12.5 | 15.4 | 0.64 |
| | 10 | 2 | 16.2 | 19.2 | 0.77 |
| | 9 | 4 | 20.5 | 31.5 | 0.54 |
| 4-hydroxytestosterone acetate | 6 | 2 | 8.01 | 10.8 | |
| 4-hydroxy-17-alpha-methyltestosterone | 10 | 0.5 | 22.6 | 32.4 | 0.61 |
| | 9 | 1 | 22.8 | 30.7 | 0.66 |
| | 9 | 2 | 30.7 | 48.1 | 0.57 |
| 4-hydroxy-17-alpha-methyltestosterone-4-acetate | 7 | 1 | 25.3 | 37.8 | 0.58 |
| 4-hydroxy-17-alpha-methyltestosterone-4-cyclopentylpropionate | 7 | 1 | 23.3 | 34.8 | 0.57 |

The results show that 4-hydroxy-17-alpha-methyltestosterone per os possesses a high myotrophic and low androgenic effect. Its myotrophic activity is about 3 times higher than that of 17-alpha-methyltestosterone, and at least 5 times higher than that of 17-alpha-ethyl-19-nortestosterone. Its androgenic activity is definitely lower than that of 17-alpha-methyltestosterone. Therefore 4-hydroxy-17-alpha-methyltestosterone presents a good therapeutic index (levator ani weight increase/ventral prostate weight increase) definitely higher than 17-alpha-methyltestosterone and comparable with 17-alpha-ethyl-19-nortestosterone.

It is worth mentioning that while 4-hydroxytestosterone acetate is devoid of oral activity, its 17-alpha-methyl derivative is orally highly effective.

Other Hormonal Effects 4-hydroxy-17-alpha-methyltestosterone is devoid of progestational activity; in fact it does not stimulate the uterine proliferation in immature rabbits primed with estradiol.

At a dosage 4 times higher than desoxycorticosterone acetate it does not present Na-retaining activity in adrenal-ectomized rats.

Other alkaline reagents soluble in a lower alkanol can be used in the dehydration of the 4,5-dehydroxy compound, viz. sodium and ammonium hydroxides.

Since our principal purpose is to make steroids of high anabolic activity by oral administration, our principal present interest, in respect to the esters, is in the type described above, and especially in the acetate and cyclopropionate. However, it is obvious to chemists, and is within the broader purview of this invention, to prepare esters of other types such as of polycarboxylic acids, and of carboxylic acids generally, containing substituents such as halo, sulphonyl, amino, nitro, and also esters of inorganic acids.

The carbon skeleton of the 4,5-dihydroxy-17-alpha-methyltestosterone is preferably unsubstituted, but the dehydration step described above is also considered generally applicable, i.e. to compounds in which said skeleton contains substituents.

The preparation of the compounds of type B will now be described.

The invention further provides a method of preparing 4,11-beta-dihydroxy-17-alpha-methyltestosterone which comprises dehydrating 4,5,11-beta-trihydroxy-17-alphamethyltestosterone (IIIA) in position 5 only, said dehydration being effected in alkaline solution, preferably by employing a methanolic solution of potassium hydroxide. Said compound IIIA is also termed 17-alpha-methyl-androstane,4,5,11-beta,17-beta-tetrol-3-one.

To obtain the esters, 4,11-beta-dihydroxy-17-alpha-methyltestosterone is reacted with a chloride or anhydride of a carboxylic acid as defined above. The esterification may be effected in the presence of a tertiary amine.

The essence of the method of this aspect of the invention is the dehydration whereby only the hydroxy group in position 5 and not that in position 17 is eliminated.

It is known in fact, that the hydroxy group in the 17-position of 17-alpha-methyltestosterone and 17-alpha-methyl-19-nortestosterone can be eliminated very easily. By reaction of the 4,5-diol-compound with a mixture of sulfuric and acetic acids, sulfuric acid in benzene, formic acid, borontrifluoride in ether, compounds are obtained lacking the 17-hydroxy group.

Only dehydration in alkaline solution causes selective elimination of the hydroxy group in the 5-position, the hydroxy group in 17-position remaining unaffected.

It has been found that 4,11-beta-dihydroxy-17-alpha-methyltestosterone is a strong protein anabolic steroid, having a high myotrophic and low androgenic effect. It possesses a strong myotrophic activity, 6–10 times higher than that of 17-alpha-methyltestosterone and the same androgenic effect as 17-alpha-methyltestosterone.

Therefore 4,11-beta-dihydroxy-17-alpha-methyltestosterone, orally highly effective, is useful in the treatment of protein depletion, preparation for surgery, recovery from surgery, recovery from severe illness, nutritional care of carcinomatosis and chronic diseases, premature infants, wound healing, bone fractures and osteoporosis.

The following example is given to illustrate the invention.

EXAMPLE 9

*4,11-Beta-Dihydroxy-17-Alpha-Methyltestosterone*

A solution of 1.35 g. of 11-beta-hydroxy-17-alpha-methyltestosterone in 40 ml. of trimethylcarbinol is treated by addition of 4.2 ml. of 36% $H_2O_2$, 0.8 ml. of water and 0.084 g. of $OsO_4$ dissolved in 6.7 ml. of trimethylcarbinol.

The solution is allowed to stand for 42 hours at room temperature, then concentrated to one third of its original volume and diluted with water. A 10% aqueous solution of sodium bisulphite is added up to precipitation and then an aqueous solution of sodium bicarbonate to neutrality. The osmium salt is filtered off and the solution is concentrated to a small volume under vacuum.

The residue is treated with 20 ml. of hot methanol and boiled with 1 g. of KOH dissolved in 10 ml. of methanol for 5 minutes in a nitrogen atmosphere. The solution is neutralized with acetic acid, concentrated to a small volume under reduced pressure and extracted with ethyl acetate. The extract is washed with water and evaporated.

The residual product (0.75 g.) is chromatographed over Florisil (30–60 mesh). The fractions eluted with benzene-ether (3:1) yield 4,11-beta-dihydroxy-17-alpha-methyltestosterone melting at 183–185° C. and having an ultraviolet absorption maximum at 278 m$\mu$ with a molecular extinction coefficient of 12,040.

Treatment of 4,11-beta-dihydroxy-17-alpha-methyl-testosterone with an acylating agent such as an acyl halide or acyl anhydride in a tertiary amine such as pyridine, at room temperature, causes selective acylation of the hydroxy group in the 4-position, the hydroxy group in the 17-position remaining unaffected. In this way the 4-esters such as the acetate, propionate, cyclopentylpropionate, benzoate, phenylpropionate can be obtained.

*Myotrophic and Androgenic Activity*

Oral myotrophic and androgenic activity of 4,11-beta-dihydroxy-17-alpha-methyltestosterone has been examined on the castrated immature rat according to levator ani muscle and ventral prostate test (L. G. Herschberger, E. G. Shipley, R. K. Meyer, Proc. Soc. Exp. Biol. Med. 83, 1953, p. 175).

The results are shown in Table II.

TABLE II.—ORAL MYOTROPHIC AND ANDROGENIC ACTIVITY OF 4,11-BETA-DIHYDROXY - 17 - ALPHA-METHYLTESTOSTERONE (THE FIGURES IN PARENTHESIS INDICATE THE NUMBER OF THE ANIMALS)

| Steroid | Daily dose, mg. | Levator ani, mg. | Ventral prostate, mg. | Therapeutic index |
|---|---|---|---|---|
| Controls | | 8.6 | 9.3 | |
| 17-alpha-methyltestosterone (41) | 1 | 13.4 | 36.3 | 0.18 |
| 17-alpha-methyltestosterone (77) | 2 | 17.7 | 43.9 | 0.26 |
| 17-alpha-methyltestosterone (6) | 4 | 25.5 | 73.7 | 0.26 |
| 4,11-beta-dihydroxy-17-alpha-methyltestosterone (8) | 0.1 | 21.2 | 22.7 | 0.94 |
| Do | 0.25 | 21.6 | 21.1 | 1.10 |
| Do | 0.5 | 24.2 | 27 | 0.88 |
| Do | 2 | 31.9 | 48.4 | 0.59 |

The data summarized in Table II demonstrate that 4,11-beta-dihydroxy-17-alpha-methyltestosterone possesses a strong myotrophic activity, 6–10 times higher than that of 17-alpha-methyltestosterone and the same andogenic effect as 17-alpha-methyltestosterone.

The preparation of the compounds of type C will now be described.

The invention further provides a method of preparing 4-hydroxy-17-alpha-methyl-19-nortestosterone which comprises dehydrating 4,5-dihydroxy-17-alpha-methyl-19-nortestosterone (IIIB) in position 5 only, said dehydration being effected in alkaline solution, preferably by employing a methanolic solution of potassium hydroxide, at room temperature (15 to 35° C.). Said compound IIIB is also termed 17-alpha-methyl-19-norandrostane, 4,5,17-triol-3-one.

To obtain the esters, 4-hydroxy-17-alpha-methyl-19-nortestosterone is reacted with a chloride or anhydride of a carboxylic acid as defined above. The esterification may be effected in the presence of a tertiary amine.

The essence of the method of the invention is the dehydration whereby only the hydroxy group in position 5 and not that in position 17 is eliminated. It is known in fact that the hydroxy group in the 17-position of 17-alpha-methyl-19-nortestosterone can be very easily eliminated. By reaction of the 4,5-diol-compound with a mixture of sulfuric and acetic acid, sulfuric acid in benzene, formic acid, borontrifluoride in ether, compounds are obtained lacking the 17-hydroxy group.

Only dehydration in olkaline solution at room temperature causes selective elimination of the hydroxy group in 5-position, the hydroxy group in 17-position remaining unaffected.

4-hydroxy-17-alpha - methyl - 19 - nortestosterone possesses high myothropic and androgenic properties. Its myotrophic activity is about 27 times higher than that of 17-alpha-methyltestosterone and its androgenic activity is 5 times higher than that of the same product, when both the steroids are administered per os. Therefore 4-hydroxy-17-alpha-methyl-19-nortestosterone is useful as androgen in the treatment of symptoms of male climacteric, male hypogondaism, menopausal symptoms, menorrhagia, metrorrhagia, and as anabolic in the treatment of protein carency.

The following example is given to illustrate the invention.

EXAMPLE 10

*4-Hydroxy-17-Alpha-Methyl-19-Nortestosterone*

A solution of 1 g. of 17-alpha-methyl-19-nortestosterone in 26 ml. of trimethyl-carbinol is treated by addition of 2.8 ml. of 30% hydrogen peroxide and 0.050 g. of osmium tetroxide in 4.5 ml. of trimethylcarbinol.

After the reaction mixture has stood at room temperature for 20 hours, an additional 0.5 ml. of hydrogen peroxide is added. The solution is allowed to stand for 22 hours, then concentrated to one third of its original volume, diluted with water and extracted four times with ethyl acetate. The extract is washed with water, several times with 10% sodium bisulphite solution, then with 4% sodium bicarbonate solution and finally with water to neutrality. The crude 17-alpha-methyl-19-nortestosterone-4,5-diol remaining after distillation of the solvent does not show ultraviolet absorption. It is then dissolved in 500 ml. of methanol and treated by addition of 1.5 g. of KOH in 20 ml. of water, and 100 ml. of methanol in a nitrogen atmosphere. The solution is allowed to stand at room temperature overnight, then neutralized with acetic acid and concentrated to a small volume; it is then diluted with water containing NaCl and extracted with ethyl acetate.

The extract is washed with water and the solvent removed. The residual product is chromatographed over Florisil 30–60 mesh. The fraction eluted with benzene and benzene-ether (9:1) yield the 4-hydroxy-17-alpha-methyl-19-nortestosterone melting at 168–170° C. and having an ultraviolet absorption maximum at 277 mμ, with a molecular extinction coefficient of 12,750.

Treatment of 4-hydroxy-17-alpha-methyl-19-nortestosterone with an acylating agent such as an acyl halide or acyl anhydride in a tertiary amine such as pyridine, at room temperature, causes selective acylation of the hydroxy group in 4-position, the 17-position remaining unaffected. In this way the 4-esters such as the acetate, propionate, cyclopentylpropionate, benzoate and phenylpropionate can be obtained.

*Pharmacological Activities*

(1) Oral myotrophic and androgenic activity of 4-hydroxy-17-alpha-methyl-19-nortestosterone were examined according to the levator ani muscle and the ventral prostate test in the castrated male rat (L. G. Herschberger, E. G. Shipley, R. K. Meyer, Proc. Soc. Exp. Biol. Med., 83, 1953, p. 175).

The results are summarized in Table III.

TABLE III.—MYOTROPHIC AND ANDROGENIC ACTIVITY IN CASTRATED RATS (THE FIGURES IN PARENTHESIS INDICATE THE NUMBER OF ANIMALS)

| Steroid | Daily dose, mg. | Method of administration | Levator ani, mg. | Ventral prostate, mg. | Therapeutic index |
|---|---|---|---|---|---|
| Controls (174) | | | 8.6 | 9.3 | |
| 17-alpha-methyltestosterone (41) | 1 | Oral | 13.4 | 36.3 | 0.18 |
| 17-alpha-methyltestosterone (77) | 2 | do | 17.7 | 43.9 | 0.26 |
| 17-alpha-methyltestosterone (6) | 4 | do | 25.5 | 73.7 | 0.26 |
| 17-alpha-etyl-19-nortestosterone (10) | 1 | do | 12.5 | 15.4 | 0.64 |
| Do | 2 | do | 16.2 | 19.2 | 0.77 |
| 17-alpha-ethyl-19-nortestosterone (9) | 4 | do | 20.5 | 31.5 | 0.54 |
| 4-hydroxy-17-alpha-methyltestosterone (10) | 0.5 | do | 22.6 | 32.4 | 0.61 |
| 4-hydroxy-17-alpha-methyltestosterone (9) | 1 | do | 22.8 | 30.7 | 0.66 |
| Do | 2 | do | 30.7 | 48.1 | 0.57 |
| 4-hydroxy-17-alpha-methyl-19-nortestosterone (8) | 0.1 | do | 18.6 | 23.7 | 0.69 |
| Do | 0.25 | do | 27.3 | 34.1 | 0.77 |
| Do | 0.5 | do | 37.1 | 49.3 | 0.71 |

The data of Table III show that 4-hydroxy-17-alpha-methyl-19-nortestosterone possesses strong myotrophic and androgenic properties, respectively 27 and 5 times more valuable than those of 17-alpha-methyltestosterone, when both the steroids are administered per os.

(2) Androgenic activity of 4-hydroxy-17-alpha-methyl-19-nortestosterone was also tested on the chick's comb test (Munson R.L., Shops M.C., Endocrinol. 62, 1958, p. 173). The results are shown in Table IV.

TABLE IV.—ANDROGENIC ACTIVITY (CHICK'S COMB TEST-LOCAL APPLICATION)

| Steroid | Daily dose γ | Comb growth index |
|---|---|---|
| Androsterone | 0.1 | 65.6 |
| Do | 0.4 | 76.7 |
| Do | 1.6 | 95.4 |
| 17-alpha-methyltestosterone | 0.1 | 62.4 |
| Do | 0.4 | 81.4 |
| Do | 1.6 | 92 |
| 4-hydroxy-17-alpha-methyl-19-nortestosterone | 0.4 | 83.6 |
| Do | 0.8 | 88.6 |
| Do | 1.6 | 92.1 |

The results summarized in Table IV demonstrate that 4-hydroxy-17-alpha-methyl-19-nortestosterone possesses the same androgenic activity as 17-alpha-methyl-testosterone and androsterone, when locally tested on the chick's comb.

(3) Other hormonal activities: 4-hydroxy-17-alpha-methyl-19-nortestosterone possesses a strong antiestrogenic activity (Edgren and Calhoun: Proc. Soc. Exp. Biol. Med., 94, 1957, p. 537). It does in fact inhibit the uterotrophic effect of oestrone in immature female mice. Its potency is about 2.5 times that of testosterone propionate.

4-hydroxy-17-alpha-methyl-19-nortestosterone does not present progestational activity (McPhail, J. Physiol. 83, 1955, p. 145); estrogenic activity (Rubin et al. Endrocinol., 49, 1951, p. 429); liver glycogen deposition (Stafford et al., Proc. Soc. Exp. Biol. Med., 89, 1955, p. 371) and antiinflammatory effect (Singer, Borman: Fed. Proc., 14, 1955, p. 281).

We claim:

1. A compound of the general formula

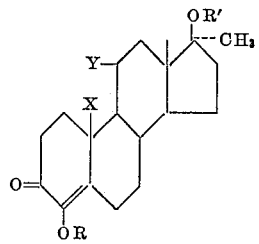

in which R and R' are taken from the group consisting of hydrogen and the same or different acyl radicals each containing not more than 9 carbon atoms, the acyl group being of the formula R₃CO— and being the acyl radical of an acid taken from the group consisting of aliphatic, aromatic, and alicyclic and aromatic substituted aliphatic acids, R₃ being a hydrocarbon group, X being taken from the class consisting of hydrogen and methyl, Y being taken from the class consisting of hydrogen and hydroxy.

2. The compounds of the formula:

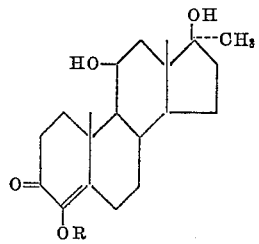

in which R is taken from the group consisting of H and acyl radicals containing not more than 9 carbon atoms, of the formula R₃CO— in which R₃ is a hydrocarbon group.

3. The compound, 4,11-beta-dihydroxy-17-alpha-methyltestosterone.

4. The compounds of the formula:

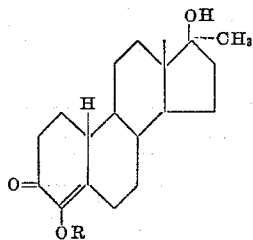

in which R is taken from the group consisting of H and acyl radicals containing not more than 9 carbon atoms, of the formula R₃CO in which R₃ is a hydrocarbon group.

5. The compound, 4-hydroxy-17-alpha-methyl-19-nortestosterone.

6. A compound of the formula:

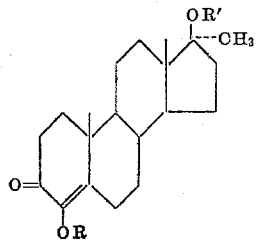

wherein R and R' are taken from the group consisting of hydrogen and —COR", in which R" is a hydrocarbon radical having no more than 9 carbon atoms.

7. 4-hydroxy-17-alpha-methyltestosterone.

8. 4-acetoxy-17-alpha-methyltestosterone.

9. The 4-cyclopentylpropionate of 4-hydroxy-17-alpha-methyltestosterone.

10. 4-hydroxy-17-alpha-methyltestosterone-4-succinate.

11. 4 - hydroxy - 17-alpha-methyltestosterone-4,17-diacetate.

12. 4-hydroxy-17-alpha-methyltestosterone-17-acetate.

13. 4 - hydroxy-17-alpha-methyltestosterone-17-propionate.

14. A process of making 4-hydroxy-17-alpha-methyltestosterone comprising allowing a compound of the group consisting of 17-alpha-methylandrostane-4-beta,5-alpha, 17-beta-triol-3-one and the corresponding 5-beta compound to stand for at least several hours at about room temperature, in a gas atmosphere inert to the reaction, in an aqueous methanol solution of KOH.

15. 4,11-beta-dihydroxy-17-alpha-methyl-testosterone-4-acetate.

16. 4,11 - beta-dihydroxy-17-alpha-methyl-testosterone-4-cyclopentylpropionate.

17. 4 - hydroxy-17-alpha-methyl-19-nortestosterone-4-acetate.

18. 4 - hydroxy-17-alpha-methyl-19-nortestosterone-4-cyclopentylpropionate.

References Cited in the file of this patent
UNITED STATES PATENTS
2,908,682    Bible et al. _____ Oct. 13, 1959

OTHER REFERENCES

"Journal of American Chemical Society" (1956), vol. 78, article by Camerino et al., page 3541 relied on.